United States Patent
Coldwate et al.

(10) Patent No.: US 10,574,123 B2
(45) Date of Patent: Feb. 25, 2020

(54) CONCENTRIC DUAL ROTOR ELECTRIC MACHINE

(71) Applicant: Hamilton Sundstrand Corporation, Charlotte, NC (US)

(72) Inventors: Joseph Kenneth Coldwate, Roscoe, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 922 days.

(21) Appl. No.: 14/972,310

(22) Filed: Dec. 17, 2015

(65) Prior Publication Data
US 2017/0179800 A1    Jun. 22, 2017

(51) Int. Cl.
*H02K 16/02* (2006.01)

(52) U.S. Cl.
CPC .................... *H02K 16/02* (2013.01)

(58) Field of Classification Search
CPC ........ H02K 16/02; H02K 17/16; H02K 19/10; H02K 19/22; H02K 21/14; H02K 21/22
See application file for complete search history.

(56) References Cited

U.S. PATENT DOCUMENTS

| | | | | |
|---|---|---|---|---|
| 2,719,931 A * | 10/1955 | Kober | ................... | H02K 21/14 310/156.29 |
| 3,169,203 A * | 2/1965 | Lavin | ..................... | H02K 39/00 310/111 |
| 3,462,626 A * | 8/1969 | Kluss | ................... | H02K 49/102 310/114 |
| 3,898,490 A * | 8/1975 | Wedman | ................ | H02K 55/00 310/114 |
| 4,532,447 A * | 7/1985 | Cibie | ..................... | H02K 51/00 310/114 |
| 6,049,152 A * | 4/2000 | Nakano | ................ | H02K 11/048 310/114 |
| 6,121,705 A * | 9/2000 | Hoong | ................... | H02K 16/02 310/103 |
| 6,211,597 B1 * | 4/2001 | Nakano | .................. | H02K 16/02 310/114 |
| 6,710,492 B2 | 3/2004 | Minagawa | | |
| 6,943,473 B2 | 9/2005 | Furuse et al. | | |
| 7,839,048 B2 | 11/2010 | Jansen et al. | | |
| 8,063,527 B2 | 11/2011 | Qu et al. | | |
| 8,106,563 B2 * | 1/2012 | Ritchey | .................. | H02K 16/00 310/112 |
| 8,222,784 B2 | 7/2012 | Serra et al. | | |
| 8,624,415 B2 | 1/2014 | Koenig | | |
| 8,701,805 B2 | 4/2014 | Park | | |

(Continued)

FOREIGN PATENT DOCUMENTS

DE    102012022089 A1 *    5/2014    ............... B60K 6/26

*Primary Examiner* — Mohamad A Musleh
(74) *Attorney, Agent, or Firm* — Cantor Colburn LLP

(57) ABSTRACT

A multi-rotor electric machine includes a first rotor, a stator, and a second rotor. The stator is disposed concentric with the first rotor and is disposed radially outward from the first rotor. The stator has a first plurality estate or windings disposed proximate first stator teeth of the stator. The stator has a second plurality of stator windings disposed proximate second stator teeth of the stator. The second rotor is disposed concentric with and is disposed radially outward from the stator. The second rotor is rotatable relative to the first rotor.

17 Claims, 2 Drawing Sheets

(56) References Cited

U.S. PATENT DOCUMENTS

| | | | |
|---|---|---|---|
| 2008/0161189 A1* | 7/2008 | Lewis | H02K 16/02 |
| | | | 505/121 |
| 2010/0139999 A1* | 6/2010 | Park | H02K 1/278 |
| | | | 180/65.51 |
| 2010/0244616 A1* | 9/2010 | Li | H02K 1/146 |
| | | | 310/216.069 |
| 2011/0187222 A1* | 8/2011 | Li | H02K 1/148 |
| | | | 310/216.016 |
| 2013/0093275 A1* | 4/2013 | Kim | H02K 16/00 |
| | | | 310/114 |
| 2013/0093276 A1* | 4/2013 | Kim | H02K 16/00 |
| | | | 310/114 |
| 2013/0181562 A1* | 7/2013 | Gieras | H02K 16/02 |
| | | | 310/114 |
| 2014/0111038 A1 | 4/2014 | Yang et al. | |
| 2015/0015104 A1* | 1/2015 | Kataoka | H02K 7/06 |
| | | | 310/80 |
| 2017/0104398 A1* | 4/2017 | Peng | H02K 3/28 |

\* cited by examiner

CONCENTRIC DUAL ROTOR ELECTRIC MACHINE

BACKGROUND OF THE INVENTION

The present invention relates to an electric machine and, in particular, to a concentric dual-winding, multi-rotor electric machine.

Vehicles, such as aircraft, are provided with generator systems. Likewise, these vehicles also have on-board equipment that are mechanically driven by an electric motor. A generator system may include a main generator, an exciter, and a permanent magnet generator. The main generator includes a rotor that has a field winding that receives a direct current to create a magnetic field that spins synchronously with the rotor. The exciter has a stationary field winding with a rotating armature winding that produces alternating current. The alternating current from the rotating armature winding is rectified to a direct current using a rotating rectifier and is fed to the wound rotor of the main generator. The current in the field winding of the exciter is controlled by a generator control unit to provide the required output from the main generator. The generator control unit may be designed such that it can be powered by either the main generator or a permanent magnet generator in the event that the main generator is not yet providing electricity. The permanent magnet generator includes permanent magnet rotors with wound stators connected to the generator control unit. Current generator systems are considerably bulky and in an attempt to provide increased performance and functionality a more compact and power dense electric machine is desired.

An electric motor typically includes a single, stationary stator, and a single rotational component, rotor. The stator has electrical windings that receive an alternating current from a separate source of which creates a rotating magnetic field within the stator/rotor airgap and as a consequence the rotor naturally follows the rotating magnetic field with its own rotation amongst its center axis. This rotor rotation is then used to turn shafting and provide mechanical power to on on-board system (e.g. fan, compressor, pump, actuator, etc.). The angular speed of the rotating magnetic field is dependent on the excitation frequency of the alternating current and the pole count of the motor. Also, depending on the rotor type, the rotor will either follow the magnetic field created by the stator synchronous, (e.g. permanent magnet rotor, switched reluctance rotor), or asynchronous (e.g. induction squirrel cage rotor). Each motor rotor type has its own specific advantages/disadvantages and one may be better suited for a particular application over another. Compromises in size, weight, cost, efficiency, and complexity of stator excitation/start-up routines are often necessary to accommodate a particular motor rotor type for a given application. Current electric motors can be considerably bulky and in an attempt to provide increased performance and functionality a more compact and power dense electric machine is desired.

SUMMARY OF THE INVENTION

In at least one embodiment, a multi-rotor electric machine is provided. The multi-rotor electric machine includes a first rotor, a stator, and a second rotor. The first rotor is disposed on a first rotating shaft. The stator is disposed concentric with the first rotor and is disposed radially outward from the first rotor. The stator has a first plurality of stator windings disposed proximate first stator teeth of the stator. The stator has a second plurality of stator windings disposed proximate second stator teeth of the stator. The second rotor is disposed on a second rotating shaft. The second rotor is disposed concentric with and radially outward from the stator. The second rotor is rotatable relative to the first rotor.

In another embodiment, a multi-rotor electric machine is provided. The multi-rotor electric machine includes a first rotor, a stator, and a second rotor. The first rotor has a first pole count. The stator is disposed concentric with the first rotor and is disposed radially outward from the first rotor. The stator has a yoke, first stator teeth that extend from the yoke, and second stator teeth that extends from the yoke. The first stator teeth define a first plurality of slots that receive a first plurality estate or windings. The second stator teeth define a second plurality of slots that receive a second plurality estate or windings. The second rotor has a second pole count. The second rotor is disposed concentric with and is disposed radially outward from the stator. The second rotor is rotatable relative to the first rotor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
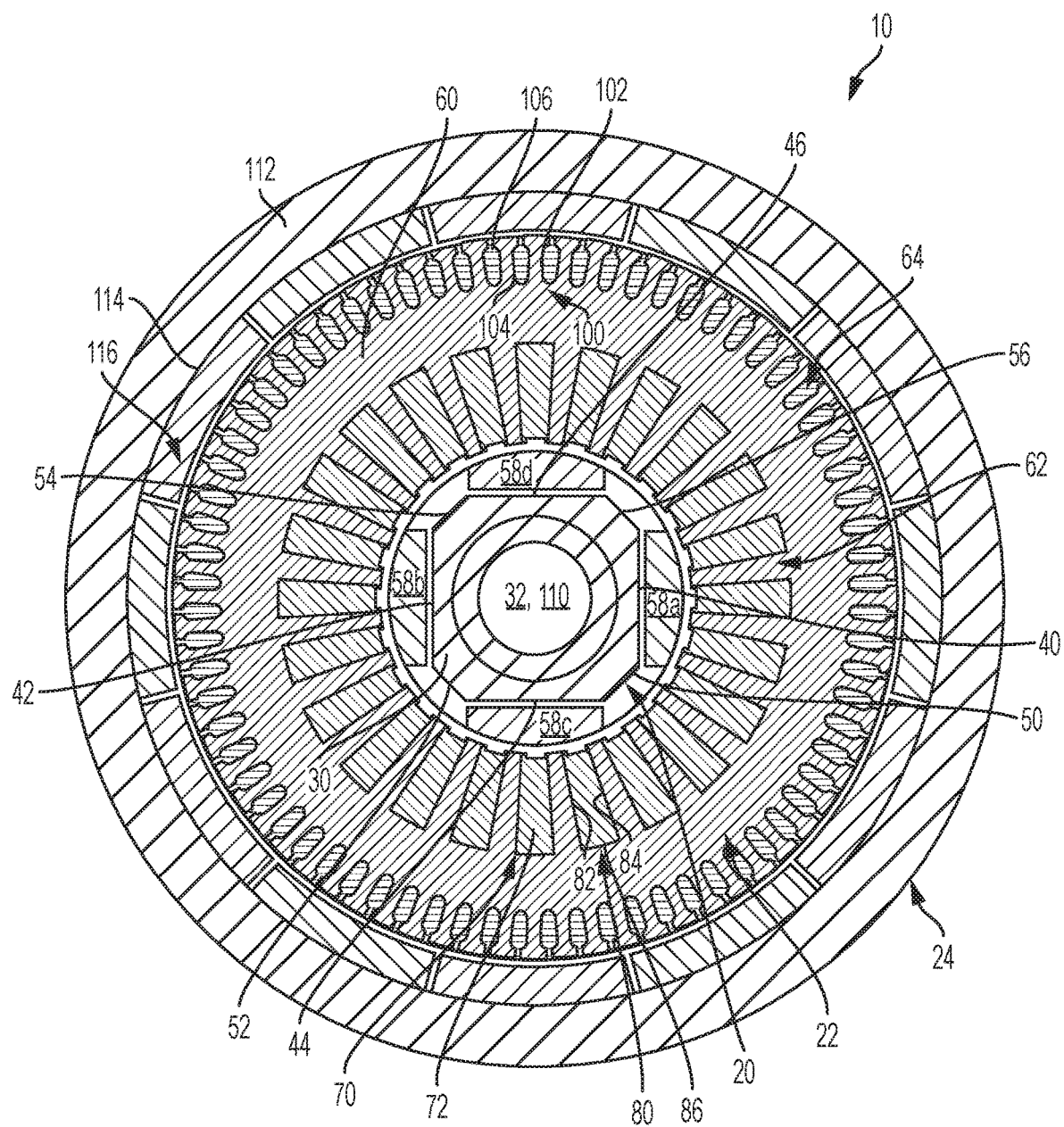
FIG. 1 is a cross-sectional view of a multi-rotor electric machine.

Referring to FIG. 1, a multi-rotor electric machine 10 is shown. The multi-rotor electric machine 10 is a multi-rotor electrical motor-generator that produces electrical power in response to rotation of at least one of a common shaft extending through the multi-rotor electric machine 10 or a first shaft operatively connected to a first portion of the multi-rotor electric machine 10 and a second shaft operatively connected to a second portion of the multi-rotor electric machine 10. The multi-rotor electric machine 10 includes two separate electric motors disposed concentrically and utilizing a single stator core with dual windings. The two separate electric motors are able to operate independently of each other. The multi-rotor electric machine 10 includes a first rotor 20, a stator 22, and a second rotor 24.

The first rotor 20 may be of a first type and the second rotor 24 may be of a second type different than the first type. In at least one embodiment, the first rotor 20 and the second rotor 24 are of the same type. The first rotor 20 may have a first power rating and the second rotor 24 may have a second power rating different than the first power rating.

The first rotor 20 or the inner rotor may be a wound field rotor, an induction rotor, a wound induction rotor, squirrel-cage induction rotor, variable reluctance rotor, a switched reluctance rotor, or permanent magnet rotor. The first rotor 20 includes a hub 30 fitted onto a first rotating shaft 32.

The hub 30 includes a first side 40, a second side 42, a third side 44, and a fourth side 46. The second side 42 is disposed opposite the first side 40. The second side 42 is disposed substantially parallel to the first side 40. The third side 44 extends between a first end of the first side 40 and a first end of the second side 42. A first chamfered region 50 extends between the first end of the first side 40 and a first end of the third side 44. A second chamfered region 52 extends between the first end of the second side 42 and a second end of the third side 44. The fourth side 46 extends between a second end of the first side 40 and a second end of the second side 42. A third chamfered region 54 extends between the second end of the second side 42 and a first end of the fourth side 46. A fourth chamfered region 56 extends between the second end of the first side 40 and a second end of the fourth side 46.

The first rotor 20 is a permanent magnet rotor having a plurality of permanent magnets that presents a first number of pole pairs having a first pole count. As illustrated in FIG. 1, the first rotor 20 has four poles (two pairs of poles). A first permanent magnet 58*a* is disposed on the first side 40 between the first chamfered region 50 and the fourth chamfered region 56. A second permanent magnet 58*b* is disposed on the second side 42 between the second chamfered region 52 and the third chamfered region 34. A third permanent magnet 58*c* is disposed on the third side 44 between the first chamfered region 50 and the second chamfered region 52. A fourth permanent magnet 58*d* is disposed on the fourth side 46 between the third chamfered region 54 and the fourth chamfered region 56.

Figure 2:
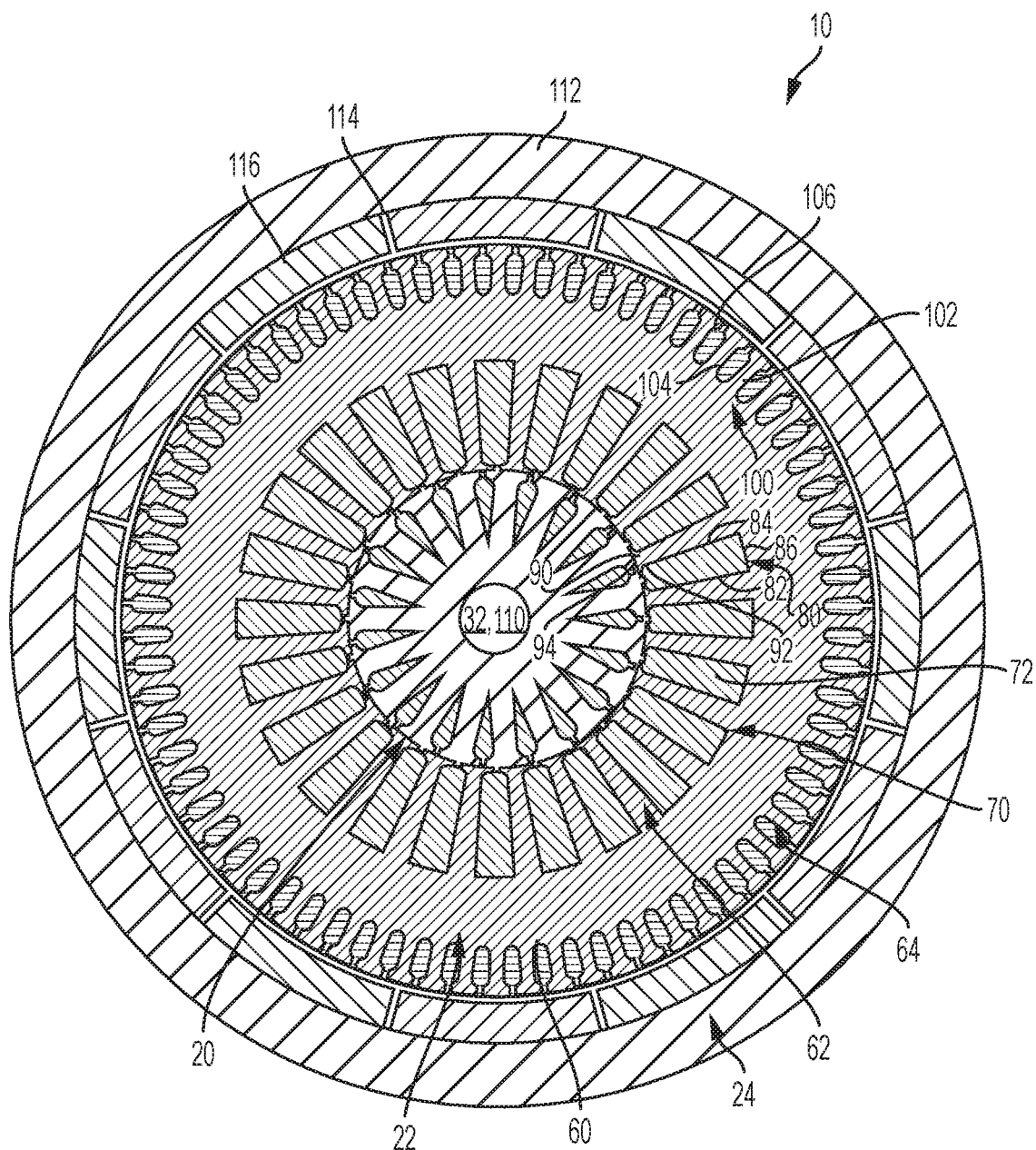
FIG. 2 is a cross-sectional view of a multi-rotor electric machine.

As illustrated in FIG. 2, the first rotor 20 is illustrated as an induction squirrel cage rotor or wound induction motor. In such an arrangement, the first rotor 20 includes a plurality of apertures having a generally keyhole shape. The apertures include angled side walls becoming progressively farther apart from each other in a direction extending away from an axis of the first rotating shaft 32.

The stator 22 is disposed concentric with the first rotor 20. The stator 22 is spaced apart from the first rotor 20 and is disposed radially outward from the first rotor 20. The stator 22 is of a single stator lamination design that accommodates both the first rotor 20 and the second rotor 24. The stator 22 includes a shared stator yoke 60. The stator iron includes first stator teeth stator teeth 62 and a second stator teeth stator teeth 64. The first stator teeth 62 and the second teeth 64 are spaced apart from each other by the shared stator yoke 60. The shared stator yoke 60, the first stator teeth 62, and the second stator teeth 64 are integrally formed.

The first stator teeth 62 extend away from the shared stator yoke 60 towards the first rotor 20 in a first direction. The first stator teeth 62 have a first plurality of slots 70 that receive a first plurality of stator windings 72.

The first plurality of slots 70 has a first shape. In at least one embodiment, each slot of the first plurality of slots 70 is configured as a generally elongate slot 80. The generally elongate slot 80 includes a first slot side 82, a second slot side 84, and an upper slot side 86 extending between ends of the first slot side 82 and the second slot side 84. The first slot side 82 extends from the upper slot side 86 towards the first rotor 20. The second slot side 84 extends from the upper slot side 86 towards the first rotor 20. The first slot side 82 and the second slot side 84 extend at an angle with respect to each other such that the first side becomes progressively closer to the second side in a direction that extends away from the upper slot side 86. An end of each of the first slot side 82 and the second slot side 84 disposed opposite the upper slot side 86 and disposed proximate the first rotor 20, is open.

As illustrated in FIG. 2, the end of each of the first slot side 82 and the second slot side 84 disposed opposite the upper slot side 86 and disposed proximate the first rotor 20 includes a tooth tip 90. The tooth tip 90 extends between adjacent slots of the first plurality of slots 70. The tooth tip 90 has a generally echinus shape such that a generally convex transition region 92 extends from the first slot side 82 and the second slot side 84 towards a tooth tip end surface 94 disposed proximate the first rotor 20. In such an arrangement, the tooth tip 90 aids in retaining the first plurality of stator windings 72 within the first plurality of slots 70.

The second stator teeth 64 extend away from the shared stator yoke 60. The second stator teeth 64 extend away from the first rotor 20 towards the second rotor 24 and a second direction opposite the first direction. The second stator teeth 64 have a second plurality of slots 100 that receive a second plurality of stator windings 102.

The second plurality of slots 100 has a second shape different from the first shape. In at least one embodiment, each slot of the second plurality of slots 100 is configured as a generally arcuate slot 104.

The end of each generally arcuate slot 104 includes a tooth tip 106. The tooth tip 106 extends over at least a portion of each slot of the second plurality of slots 100. The tooth tip 106 extends between adjacent slots of the second plurality of slots 100. The tooth tip 106 has a generally bar shape. In such an arrangement, the tooth tip 106 aids in retaining the second plurality of stator windings 102 within the second plurality of slots 100.

The second rotor 24 or the outer rotor may be a wound field rotor, an induction rotor, a wound induction rotor, squirrel-cage induction rotor, variable reluctance rotor, a switched reluctance rotor, or permanent magnet rotor.

The second rotor 24 is disposed on a second rotating shaft 110. In at least one embodiment, the second rotor 24 is also disposed on a common shaft with the first rotor 20 such as the first rotating shaft 32 or the second rotating shaft 110. The second rotor 24 is configured to rotate relative to the first rotor 20 and the stator 22.

The second rotor 24 includes a housing 112 having an inner surface 114 and a plurality of permanent magnets 116 disposed on the inner surface 114. The plurality of permanent magnets 116 present a second number of pole pairs having a second pole count. As illustrated in, FIGS. 1 and 2, the second pole count is different than the first pole count. In at least one embodiment, the first pole count is the same as the second pole count.

The second rotor 24 is disposed concentric with the first rotor 20 and the stator 22. The second rotor 24 is spaced apart from the stator 22 and is disposed radially outward from the stator 22.

The first rotor 20 and the second rotor 24 may act simultaneously as a generator and a motor. As a current is applied to at least one of the first plurality of stator windings 72 or the second plurality of stator windings 102 of the stator 22, at least one of the first rotor 20 and the second rotor 24 is configured to rotate. In at least one embodiment, the first rotor 20 and the second rotor 24 are tied together such that the first rotor 20 is used to start the multi-rotor electric machine 10 before the second rotor 24 provides torque.

A current may be applied to the first plurality of stator windings 72 and the first rotor 20 begins to rotate to start the multi-rotor electric machine 10. A subsequent current may be applied to the second plurality of stator windings 102 and the second rotor 24 begins to rotate. Such a configuration or strategy enables line starting of the second rotor 24. Additionally, the first rotor 20 provides damping for the second rotor 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A multi-rotor electric machine comprising:
    a first rotor disposed on a first rotating shaft;
    a stator disposed concentric with the first rotor and is disposed radially outward from the first rotor, the stator having a first plurality of stator windings disposed proximate first stator teeth of the stator and a second plurality of stator windings disposed proximate second stator teeth of the stator, wherein the first stator teeth extends from a shared yoke in a first direction and the second stator teeth extends from the shared yoke in a second direction opposite the first direction, wherein the shared yoke, the first stator teeth and the second stator teeth are integrally formed as a single unitary piece, wherein the first stator teeth of the stator defines a first plurality of slots that receive the first plurality of stator windings and the second stator teeth defines a second plurality of slots that receive the second plurality of stator windings, wherein each of the first plurality of slots has a generally elongate shape and each of the second plurality of slots has a generally arcuate shape; and
    a second rotor disposed on a second rotating shaft, the second rotor disposed concentric with and is disposed radially outward from the stator, the second rotor rotatable relative to the first rotor.

2. The multi-rotor electric machine of claim 1, wherein the second stator teeth of the stator defines a tooth tip that extends over at least a portion of each slot of the second plurality of slots.

3. The multi-rotor electric machine of claim 1, wherein the first rotor is an induction type rotor and the second rotor is an induction type rotor.

4. The multi-rotor electric machine of claim 1, wherein the first rotor includes a wound field rotor.

5. The multi-rotor electric machine of claim 1, wherein the first rotor includes an induction squirrel cage rotor.

6. The multi-rotor electric machine of claim 1, wherein the first rotor includes a variable reluctance rotor.

7. A multi-rotor electric machine comprising:
    a first rotor having a first pole count;
    a stator is disposed concentric with the first rotor and is disposed radially outward from the first rotor, the stator having a yoke, first stator teeth extending from the yoke, and second stator teeth extending from the yoke, the first stator teeth defining a first plurality of slots that receive a first plurality of stator windings and the second stator teeth defining a second plurality of slots that receive a second plurality of stator windings, wherein the yoke, the first stator teeth and the second stator teeth are integrally formed as a single unitary piece, and wherein each of the first plurality of slots has a generally elongate shape and each of the second plurality of slots has a generally arcuate shape; and
    a second rotor having a second pole count, the second rotor is disposed concentric with and is disposed radially outward from the stator, the second rotor rotatable relative to the first rotor.

8. The multi-rotor electric machine of claim 7 wherein the first pole count is the same as the second pole count.

9. The multi-rotor electric machine of claim 8 wherein the first pole count is different than the second pole count.

10. The multi-rotor electric machine of claim 8 wherein the first rotor and the second rotor are disposed on a common shaft.

11. The multi-rotor electric machine of claim 8 wherein the first rotor is disposed on a first shaft and the second rotor is disposed on a second shaft.

12. The multi-rotor electric machine of claim 8, wherein the stator defines a tooth tip that extends over at least a portion of each slot of the first plurality of slots.

13. The multi-rotor electric machine of claim 8, wherein the second rotor includes a plurality of permanent magnets.

14. The multi-rotor electric machine of claim 8, wherein the first rotor is of a first type and the second rotor is of a second type different than the first type.

15. The multi-rotor electric machine of claim 8, wherein the first rotor includes a wound induction motor.

16. The multi-rotor electric machine of claim 8, wherein the first rotor includes an induction squirrel cage rotor.

17. The multi-rotor electric machine of claim 8, wherein the first rotor includes a variable reluctance rotor.

* * * * *